United States Patent [19]

Tempco et al.

[11] Patent Number: 5,434,369
[45] Date of Patent: Jul. 18, 1995

[54] AUTOMATED SECONDARY DISCONNECT MECHANISM FOR ELECTRICAL SWITCHGEAR

[75] Inventors: Dale A. Tempco, Florence; Murray K. Jones, Johnsonville; Levern Ellerbe, Effingham, all of S.C.

[73] Assignee: ABB Power T & D Company, Inc., Blue Bell, Pa.

[21] Appl. No.: 195,934

[22] Filed: Feb. 14, 1994

[51] Int. Cl.[6] .................. H01H 9/00; H02B 11/00
[52] U.S. Cl. .................. 200/50 AA; 361/605
[58] Field of Search .................. 200/50 AA; 361/605-621

[56] References Cited

U.S. PATENT DOCUMENTS

| | | | |
|---|---|---|---|
| 3,188,415 | 6/1965 | Netzel | 200/50 AA |
| 4,020,301 | 4/1977 | Ericson et al. | 200/50 AA |
| 4,139,748 | 2/1979 | Wolfe et al. | 200/50 AA |
| 4,236,189 | 11/1980 | Yoshida | 361/607 |
| 4,395,602 | 7/1983 | Castonguay | 200/50 AA |
| 4,477,701 | 10/1984 | Castonguay et al. | 200/50 AA |
| 4,565,908 | 1/1986 | Bould | 200/50 AA |
| 4,743,715 | 5/1988 | Gerbert-Gaillard | 200/50 AA |
| 4,761,521 | 8/1988 | Beck et al. | 200/50 AA |
| 5,043,541 | 1/1991 | Krafft et al. | 200/55 AA |

*Primary Examiner*—J. R. Scott
*Attorney, Agent, or Firm*—Woodcock Washburn Kurtz Mackiewicz & Norris

[57] ABSTRACT

An automatic secondary disconnect mechanism for an electrical switchgear apparatus having an enclosure and a removable circuit device is disclosed. According to a preferred embodiment, the automatic secondary disconnect mechanism comprises a guide rail mounted to the enclosure so as to extend substantially parallel to the racking motion of the circuit device; a slide member slidably mounted on the guide rail; apparatus for locking the slide member in place on the guide rail at a point corresponding to a test position of the circuit device; and apparatus for releasing the slide member when the circuit device reaches the test position from the disconnect position. One of a pair of mating secondary contact members is coupled to the slide member, while the other mating contact member is coupled to the circuit device. The mating secondary contact members automatically engage as the circuit breaker moves from the disconnect position to the test position, remain engaged and move together via the slide member as the circuit breaker moves between the test and connect positions, and automatically disengage as the circuit breaker moves past the test position toward the disconnect position.

19 Claims, 8 Drawing Sheets

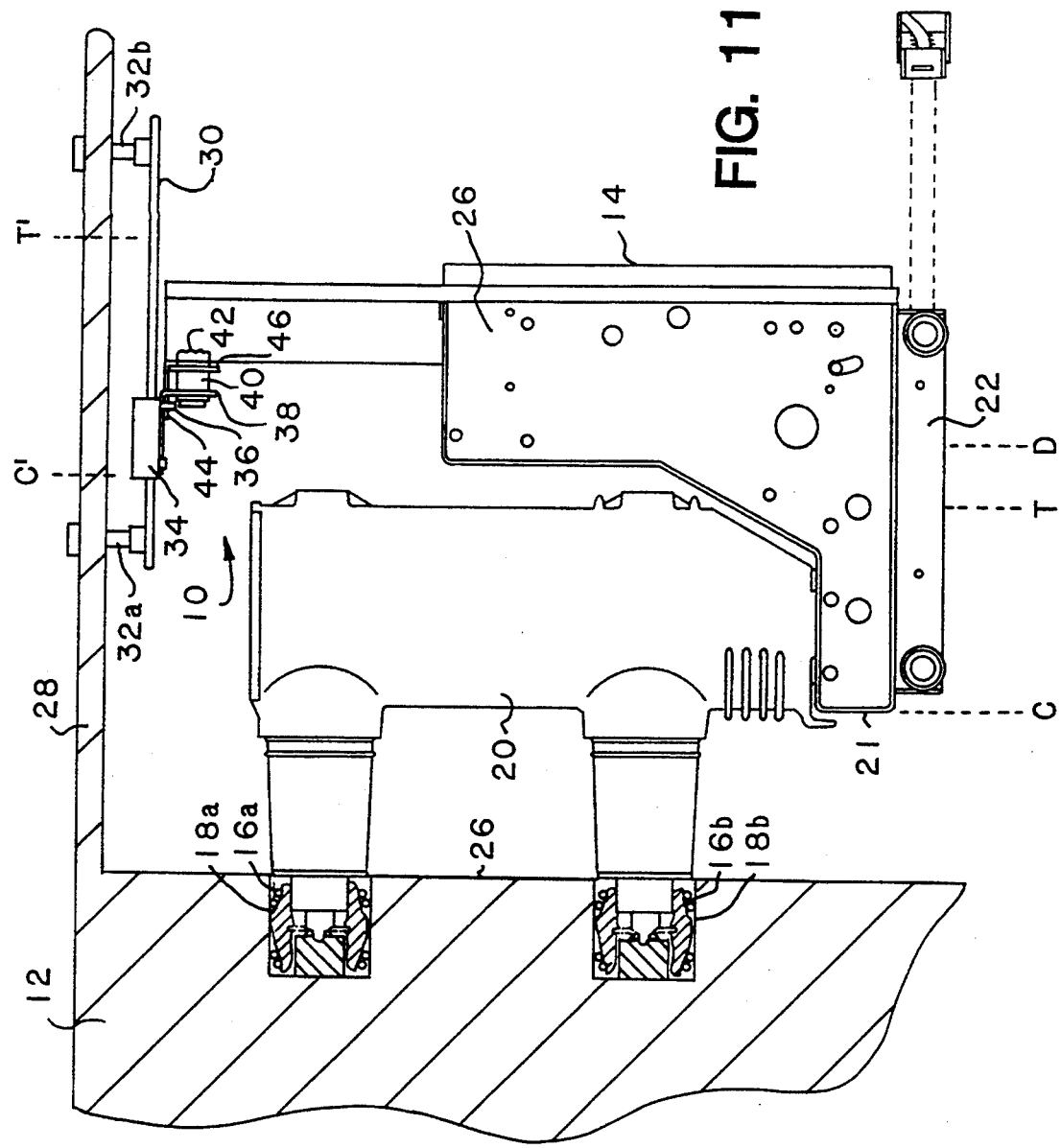

AUTOMATED SECONDARY DISCONNECT MECHANISM FOR ELECTRICAL SWITCHGEAR

BACKGROUND OF THE INVENTION

1. Field of the Invention

The present invention relates generally to electrical switchgear apparatus, and more particularly, to an automatic secondary disconnect mechanism for a removable circuit device.

2. Description of the Prior Art

Circuit breakers for medium voltage switchgear applications, or circuit devices in general, are typically housed in a metal enclosure and are removable. So-called "drawout" apparatus are used to move the circuit breakers between a disconnect position, in which the primary contacts of the circuit breaker are fully disengaged from the mating primary contacts within the enclosure, and a connect position in which the primary contacts of the circuit breaker and enclosure are fully engaged. A racking mechanism is usually employed to ensure steady movement and proper alignment of the circuit breaker as it moves between the disconnect and connect positions.

Circuit breakers are typically equipped with a variety of auxiliary electronic devices and related control circuitry, including switches, motors, solenoids and the like, for providing electronic control of the circuit breaker. For example, automatic operation of the circuit breaker's interrupter contacts may be achieved through the use of such auxiliary devices and control circuitry. Of course, power must be supplied to the auxiliary devices and control circuitry at some point.

Typically, power is provided to the auxiliary devices and control circuitry through mating secondary contacts mounted with the circuit breaker and enclosure. At some point during movement of the circuit breaker from the disconnect position to the connect position, the respective secondary contacts on the circuit breaker and enclosure must be engaged so that power is provided to the auxiliary devices and control electronics. Upon removal of the circuit breaker, the secondary contacts must be disengaged. Additionally, it is common to provide a test position between the connect and disconnect positions of the circuit breaker wherein the secondary contacts are engaged, but the primary contacts are not engaged. With the secondary contacts engaged, but the primary contacts disengaged, the auxiliary functions of the circuit breaker can be thoroughly tested in safety while the breaker is "dead". For example, automatic opening and closing of the circuit breaker's interrupter switches can be tested.

It is generally desirable for the secondary contacts to engage as the circuit breaker reaches the test position and to remain engaged as the circuit breaker continues past the test position to the full connect position. Likewise, upon removal of the circuit breaker it is desirable for the secondary contacts to remain engaged as the circuit breaker moves from the connect position back to the test position, but then to disengage as the circuit breaker moves past the test position to the full disconnect position. Mechanisms for connecting and disconnecting the secondary contacts are generally referred to in the art as "secondary disconnects". Although some prior art switchgear apparatus provide a manual secondary disconnect mechanism, it is generally more desirable to provide an automatic secondary disconnect mechanism in which engagement and disengagement of the secondary contacts is incident to the racking movement of the circuit breaker into and out of its enclosure.

Netzel and Ericson et al., U.S. Pat. Nos. 3,188,415 and 4,020,301, respectively, have both tried to meet the aforementioned objectives through the use of a secondary disconnect mechanism wherein the secondary contacts comprise a pair of conductive strips fixedly mounted to the circuit breaker and enclosure in parallel relation. As the circuit breaker moves into the test position, the respective contact strips begin to slide upon each other. As the circuit breaker moves past the test position into the full connect position, the respective contact strips continue to slide against each other, thereby maintaining contact throughout the entire travel of the circuit breaker. When the circuit breaker moves out of the enclosure, the sliding contacts slide off each other. Unfortunately, sliding contacts are subject to increased wear and require more frequent maintenance. Additionally, because proper connection depends upon continuous engagement of the two contact as they slide over each other, sliding contacts are more likely to fail or falter at some point during movement of the circuit breaker. For these reasons, sliding contacts do not provide an acceptable solution.

Bould and Wolfe et al., U.S. Pat. Nos. 4,565,908 and 4,139,748, both describe secondary disconnect mechanisms wherein one of the secondary contact halves or members is fixedly attached to the circuit breaker, while the mating secondary contact member is slidably mounted to a guide pin attached to the switchgear enclosure. Each mechanism uses a spring to bias the movable contact member against the fixed contact member on the circuit breaker. As the circuit breaker moves into the test position, the spring provides sufficient biasing in the opposite direction to allow the mating contact members to engage. Once engaged, the contact members move together along the guide pin against the biasing of the spring as the circuit breaker continues to the full connect position. When the circuit breaker is withdrawn from the enclosure, the force provided by the spring keeps the connector halves together as the circuit breaker moves back out to the test position. As the circuit breaker continuous past the test position toward the disconnect position, the movable contact member reaches the end of its travel along the guide pin and therefore the two contact members disengage. While use of a spring biased, movable contact member may overcome some of the disadvantages of the sliding contact mechanisms described by Netzel and Ericson et al., the present inventors have found that biasing the movable contact member with a spring is undesirable. Most notably, use of a spring to bias the movable secondary contact member makes it difficult to ensure proper alignment of the secondary contact members upon initial engagement at the test position. Additionally, the spring may impede the racking motion of the circuit breaker.

Other secondary disconnect mechanisms are described in U.S. Pat. Nos. 4,743,715 (Gerbert-Gaillard et al), 4,761,521 (Beck et al.), 4,236,189 (Yosida) and 5,043,541 (Krafft et al.). However, each of these secondary disconnect mechanisms is either too complex to implement efficiently or is not fully automatic. Consequently, there is a need for an automatic secondary disconnect mechanism that is inexpensive, uses few moving parts, and overcomes the aforementioned limitations and deficiencies of known secondary disconnect mechanisms. The present invention satisfies this need.

SUMMARY OF THE INVENTION

The present invention is directed to an automatic secondary disconnect mechanism for an electrical switchgear apparatus having an enclosure and a removable circuit device wherein the circuit device is movable into and out of the enclosure between disconnect, test and connect positions. According to the invention, the automatic secondary disconnect mechanism comprises a guide rail mounted on one of either the enclosure or the circuit device and positioned thereon so that it extends substantially parallel to the direction of movement of the circuit device into and out of the enclosure. In the preferred embodiment, the guide rail is mounted on the enclosure.

The secondary disconnect mechanism of the present invention further comprises a slide member slidably mounted on the guide rail and means for locking the slide member in place on the guide rail at a point corresponding to the test position of the circuit device. Means that cooperate with the locking means are provided for releasing the slide member from its locked position when the circuit device reaches the test position from the disconnect position, and for maintaining its release to enable the slide member to slide along the guide rail as the circuit device moves between the test and connect positions.

One of a pair of mating secondary contact members is coupled to the slide member, while the other secondary contact member is coupled to the other one of the enclosure or the circuit device. The mating secondary contact members are disposed relative to each other such that when the slide member is in its locked position on the guide rail, the secondary contact members will engage as the circuit device moves from the disconnect position to the test position. In the preferred embodiment, wherein the guide rail is mounted on the enclosure, the "other" contact member is coupled to the circuit device.

Preferably, the guide rail has a slot formed therein proximate the point corresponding to the test position of the circuit device, and the locking means comprises at least one arm pivotally mounted on the slide member and adapted to pivot into the slot thereby locking the slide member to the guide rail. According to a most preferred embodiment, the guide rail has a pair of slots formed on opposite side edges thereof, and the locking means comprises a pair of opposing arms each pivotally mounted on the slide member. Each of the opposing arms is operable to pivot into a respective one of the slots. One or more springs may be employed to bias the pivot arm(s) toward the slot(s).

According to the preferred embodiment, wherein the locking means comprises at least one pivot arm adapted to pivot into a respective slot on the guide rail, the releasing means preferably comprises a rigid tongue member coupled to the circuit device and adapted to engage the arm and to pivot the arm out of the slot when the circuit device reaches the test position from the disconnect position.

According to another aspect of the present invention, the guide rail has a stop member disposed thereon proximate the point corresponding to the test position of the circuit device. The stop member operates to prevent the slide member from sliding past that point when the circuit device moves from the test position toward the disconnect position. As a result, the secondary contact members automatically disengage.

As more fully explained hereinafter, the secondary disconnect mechanism of the present invention enables the mating secondary contact members to engage automatically as the circuit device moves from the disconnect position to the test position, to remain engaged and move with the circuit device (via the slide member) as the circuit device moves between the test position and the connect position, and to disengage automatically as the circuit device moves past the test position back toward the disconnect position. Although it is preferable to mount the guide rail and slide member to the enclosure while fixedly attaching the tongue member to the circuit device, the opposite arrangement may be employed wherein the guide rail and slide member are mounted on the circuit device and the tongue member is fixedly mounted on the enclosure. Furthermore, although the secondary disconnect mechanism of the present invention is particularly well suited for use with removable circuit breakers, the secondary disconnect mechanism of the present invention may be employed with any removable circuit device equipped with secondary contact members.

Other features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings:

FIG. 11 illustrates the operation of the secondary disconnect mechanism of the present invention as the circuit breaker of FIG. 1 moves from the test position (T) to the connect position (C).

DETAILED DESCRIPTION OF THE PREFERRED EMBODIMENT

Figure 1:
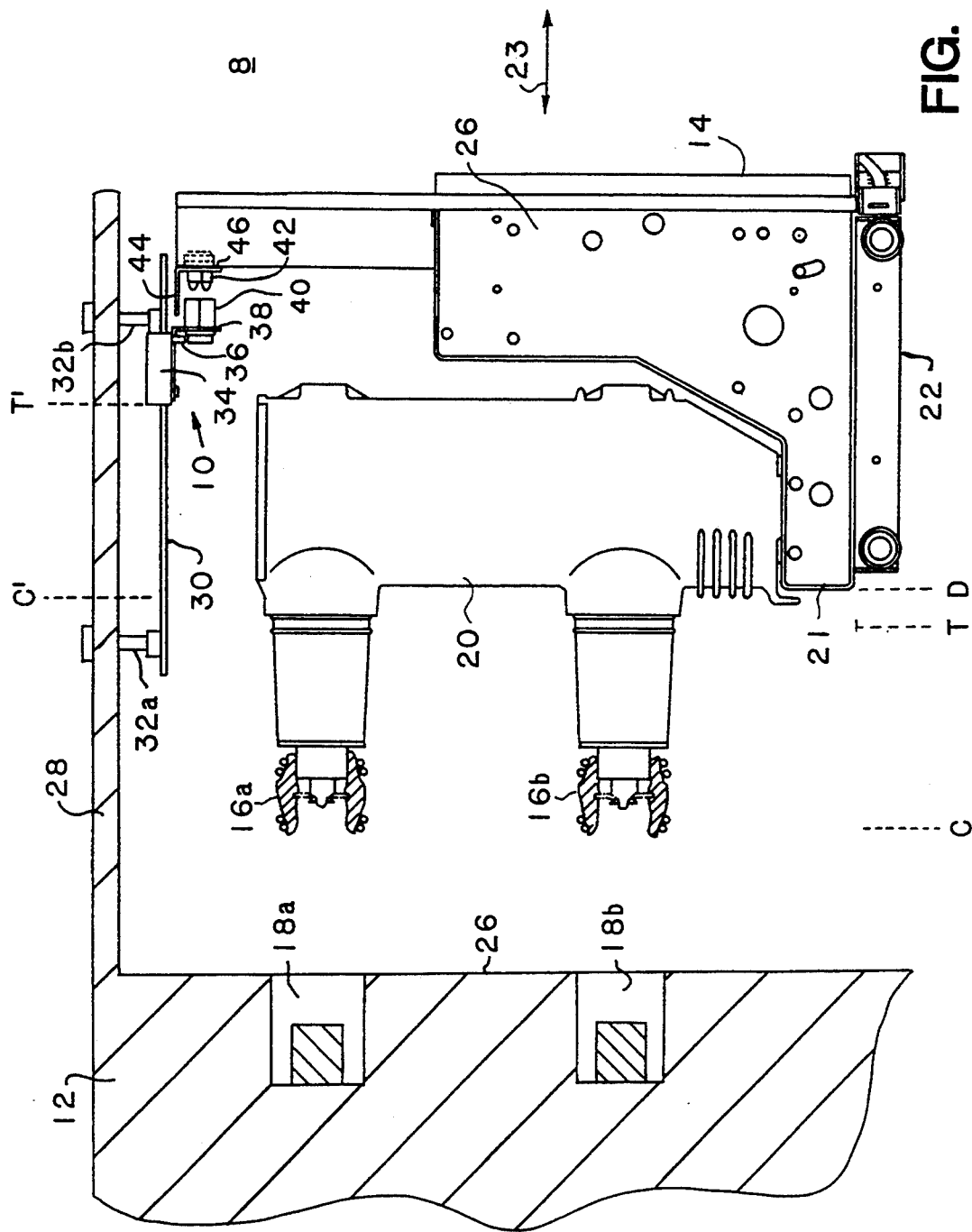
FIG. 1 is a cutaway side view of an exemplary switchgear apparatus employing a secondary disconnect mechanism in accordance with the present invention.

Referring to the drawings, wherein like numerals indicate like elements throughout, there is shown in FIG. 1 an exemplary switchgear apparatus 8 employing a secondary disconnect mechanism 10 in accordance with a preferred embodiment of the present invention. As shown, the exemplary switchgear apparatus 8 comprises an enclosure 12 and a removable circuit device 14, which in the present example comprises a circuit breaker having first and second primary contacts 16a and 16b. Mating primary contacts 18a and 18b are provide on a rear wall 26 of the enclosure 12. A racking mechanism 22 facilitates movement of the circuit breaker 14 into and out of the enclosure 12 between disconnect (D), test (T) and connect (C) positions, which are indicated in FIG. 1 with reference to a forward edge 21 of the circuit breaker 14. Arrows 23 indicate the direction of movement of the circuit breaker 14 into and out of the enclosure 12. The circuit breaker 14 further comprises a pole assembly 20, which contains a pair of interrupter switches (not shown), and a housing 26 that contains auxiliary devices and control circuitry (not shown). As described hereinafter in greater detail, power is supplied to the auxiliary devices and control circuitry through a pair of mating secondary contact members 40 and 42, which form part of the automatic secondary disconnect mechanism 10 of the present invention. FIG. 1 shows the circuit breaker 14 in the disconnect (D) position wherein both the primary contacts 16, 18 and secondary contacts 40,42 are disengaged. Although the secondary disconnect mechanism 10 of the present invention is illustrated in FIG. 1 in connection with a removable circuit breaker, it is understood that the secondary disconnect mechanism of the present invention may be employed with any removable circuit device equipped with secondary contact members.

Figure 2:
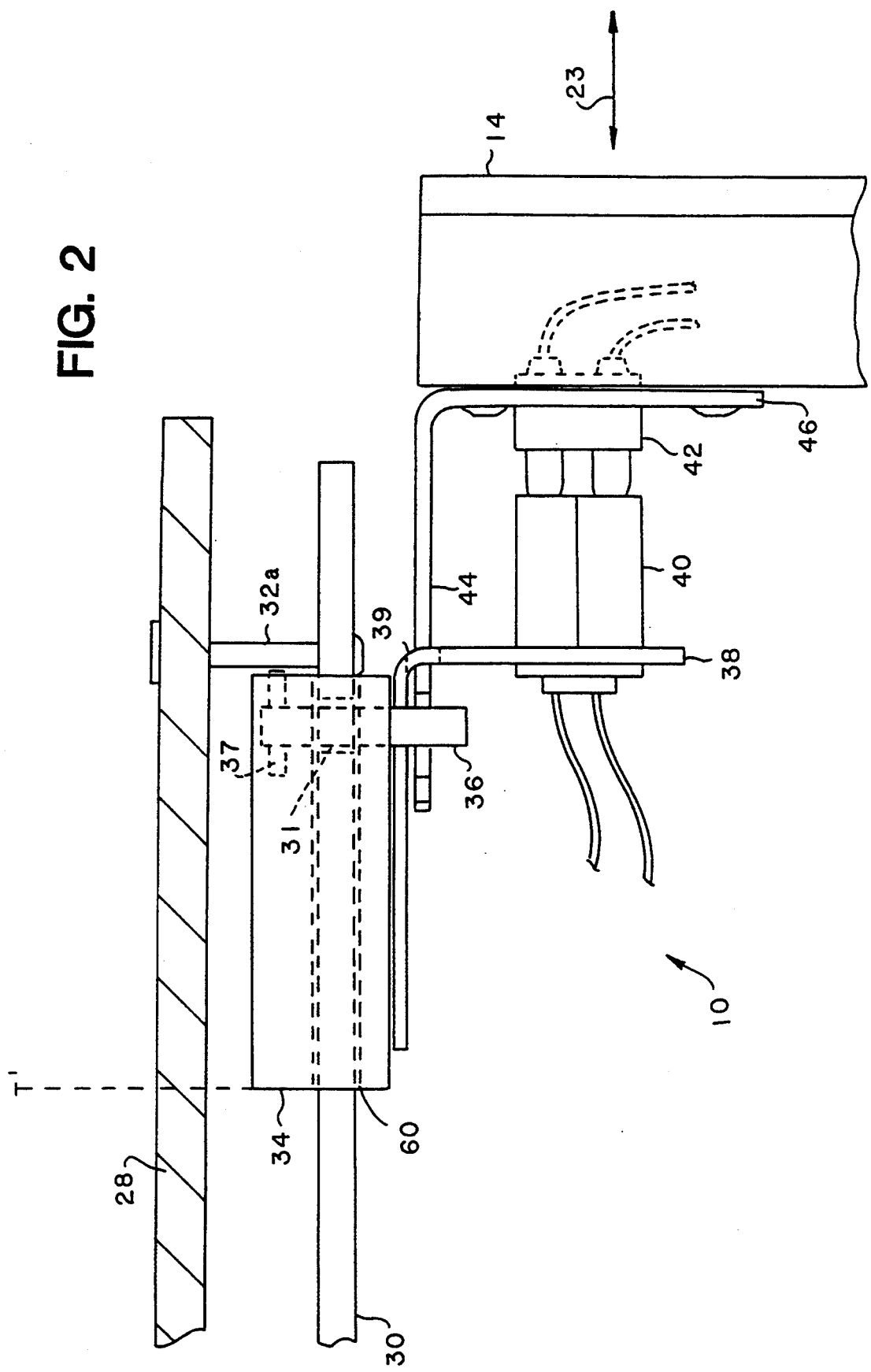
FIG. 2 is a side view of the secondary disconnect mechanism of FIG. 1 according to a preferred embodiment of the present invention.

Referring to FIG. 2, a preferred embodiment of the secondary disconnect mechanism 10 of the present invention is shown. According to the preferred embodiment, the secondary disconnect mechanism comprises a guide rail 30 mounted to the enclosure 12 so that it extends substantially parallel to the direction of movement 23 of the circuit breaker into and out of the enclosure 12. In the exemplary switchgear apparatus 8 of FIG. 1, the guide rail 30 is mounted at opposite ends to an outer wall 28 of the enclosure 12 using a pair of stand-offs and associated mounting hardware 32a, 32b. A slide member 34 is slidably mounted on the guide rail and operable to slide back and forth lengthwise of the guide rail 30. In the preferred embodiment, the slide member 34 is mounted to the guide rail 30 via an opening 60 that extends lengthwise through the center of the slide member 34.

The secondary disconnect mechanism 10 further comprises means for locking the slide member in place on the guide rail at a point (T') corresponding to the test position (T) of the circuit device 14. According to the preferred embodiment, the locking means comprises at least one slot 31 formed on the guide rail 30 and at least one arm 36 pivotally mounted on the slide member 34 and adapted to pivot into and engage the slot 31, thereby locking the slide member 34 to the guide rail 30 at point (T') which, as will become evident hereinafter, corresponds to the test position (T) of the circuit device 14. As described hereinafter in greater detail, the arm 36 pivots about a shaft 37 disposed in an upper portion of the slide member 34. Preferably, a spring (not shown) is provided to bias the arm 36 toward the guide rail 30 so that the arm 36 is urged into the slot 31 when the slide member 34 is positioned at T'. As described below, in a most preferred embodiment, the locking means comprises a pair of arms that engage a pair of slots formed on opposite sides of the guide rail 30. However, a single arm 36 and slot 31 can be employed, if desired.

The secondary disconnect mechanism 10 further comprises means for releasing the slide member 34 from its locked position T' on the guide rail 30 when the circuit device 14 reaches the test position (T) from the disconnect position (D), and for maintaining its release to enable the slide member 34 to slide freely along the guide rail 30 as the circuit device 14 moves between the test (T) and connect (C) positions. In the preferred embodiment, wherein the locking means comprises a slot 31 and a pivotally mounted arm 36, the releasing means comprises a rigid tongue member 44 fixedly attached to the circuit device 14. The tongue member 44 is adapted to engage the arm 36 and to pivot the arm 36 out of the slot 31 when the circuit device 44 reaches the test position (T). As can be appreciated, once the arm 36 is pivoted out of the slot 31, the slide member 34 is free to slide along the guide rail 30.

As mentioned previously, a pair of mating secondary contact members 40 and 42, through which power is supplied to the control circuitry on the circuit breaker 14, are coupled to the slide member 34 and circuit breaker 14, respectively. According to the preferred embodiment, the secondary contact member 40 is coupled to the slide member 34 using a right-angle bracket 38. Bracket 38 may be fixedly attached to the slide member 34 using any suitable hardware (not shown). Alternatively, bracket 38 may be integrally formed with the slide member 34. The other mating secondary contact member 42 is coupled to the circuit device 14 via bracket 46. As explained hereinafter, the respective contact members 40, 42 are disposed relative to each other (via the respective mounting brackets 38, 46) such that, when the slide member 34 is locked to the guide rail at position T', the contact members 40, 42 will fully engage by the time the circuit breaker 14 reaches the test position T. In this respect, the locked position of the slide member 34 at point T' is said to "correspond" to the test position (T) of the circuit device 14.

Preferably, the mounting hardware used to mount the contact member 42 to the bracket 46 prevents movement of the contact member 42 (relative to the circuit device 14) in the direction of movement 23 of the circuit device 14, but allows some movement of the contact member 42 in directions perpendicular to the direction of movement of the circuit device 14. Allowing the contact member 42 to move or "float" perpendicular to the direction of movement of the circuit device 14 compensates for any misalignment of the mating contact members 40, 42 as they begin to engage near the test position. Generally, only a small degree of movement is needed to compensate for any such misalignment.

The tongue member 44 may be integrally formed with the bracket 46, as shown in FIG. 2, or alternatively, the tongue member 44 may be separately assembled to the circuit device 14. As described hereinafter, as the circuit device 14 moves from the disconnect position (D) toward the test position (T), the tongue member 44 passes through an opening 39 in the mounting bracket 38 and eventually engages the pivot arm(s)

36. Preferably, the guide rail 30, pivot arm(s) 36, tongue member 44 and brackets 38 and 46 are formed of metal. The slide member 34 is preferably formed of a plastic material.

Figure 3:
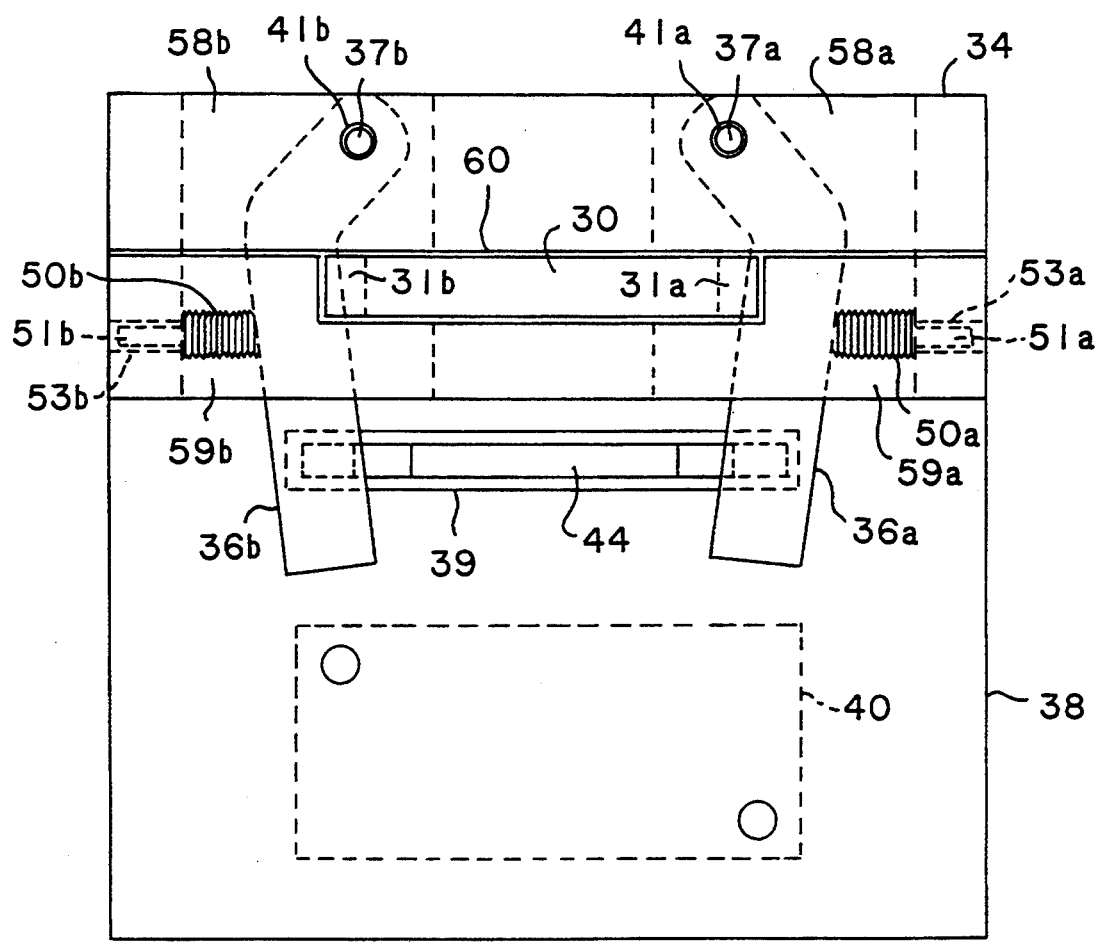
FIG. 3 is an end view of the secondary disconnect mechanism of FIG. 2.

FIG. 3 is an end view of the automatic secondary disconnect mechanism 10 of the present invention looking from the rear wall 26 of the enclosure 12 outward. As shown, the slide member 34 preferably comprises a top plate 34a and a bottom plate 34b that are assembled together on the guide rail 30 as described hereinafter. FIG. 3 illustrates a most preferred embodiment of the present invention wherein two opposing arms 36a, 36b and respective slots 31a, 31b are employed as the means for locking the slide member 34 to the guide rail at point T'. As mentioned above, however, a single arm (e.g. 36a) and slot (31a) can be employed.

As shown in FIG. 3, each arm 36a, 36b pivots about a respective rotation shaft 37a, 37b disposed in a cylindrical bore 41a, 41b in the top plate 34a of the slide member 34. Each of the arms 36a, 36b is biased toward the guide rail 30 by a respective compression spring 50a, 50b. The springs 50a, 50b are disposed in respective cutouts 59a, 59b in the bottom plate 34a, and are maintained in place by pins 51a, 51b. Pins 51a and 51b are inserted through respective bores 53a, 53b in the sides of the bottom plate 34b such that a portion of each pin 51a, 51b extends axially through the center of its respective spring 50a, 50b, thereby holding the spring in place. The springs 50a, 50b operate to bias the arms 36a, 36b toward each other so that they pivot into their respective slots 31a, 31b when the slide member is at point T'. In other embodiments, a single spring (not shown) may be coupled between the two arms 36a, 36b in order to urge the two arms 36a, 36b together.

As further shown in FIG. 3, the tongue member 44, which is fixedly attached to the circuit device 14, and the opening 39 in bracket 38 are aligned so that as the circuit breaker begins to move from the disconnect position (D) toward the test position (T), the tongue member begins to pass through the opening 39 to engage the arms 36a, 36b. FIG. 3 illustrates the position of the arms 36a, 36b when the tongue member has just begun to pass through the opening 39. At this point, the circuit breaker 14 has not fully reached the test position (T), and therefore, the arms 36a, 36b are still engaged with their respective slots 31a, 31b.

Figure 4:
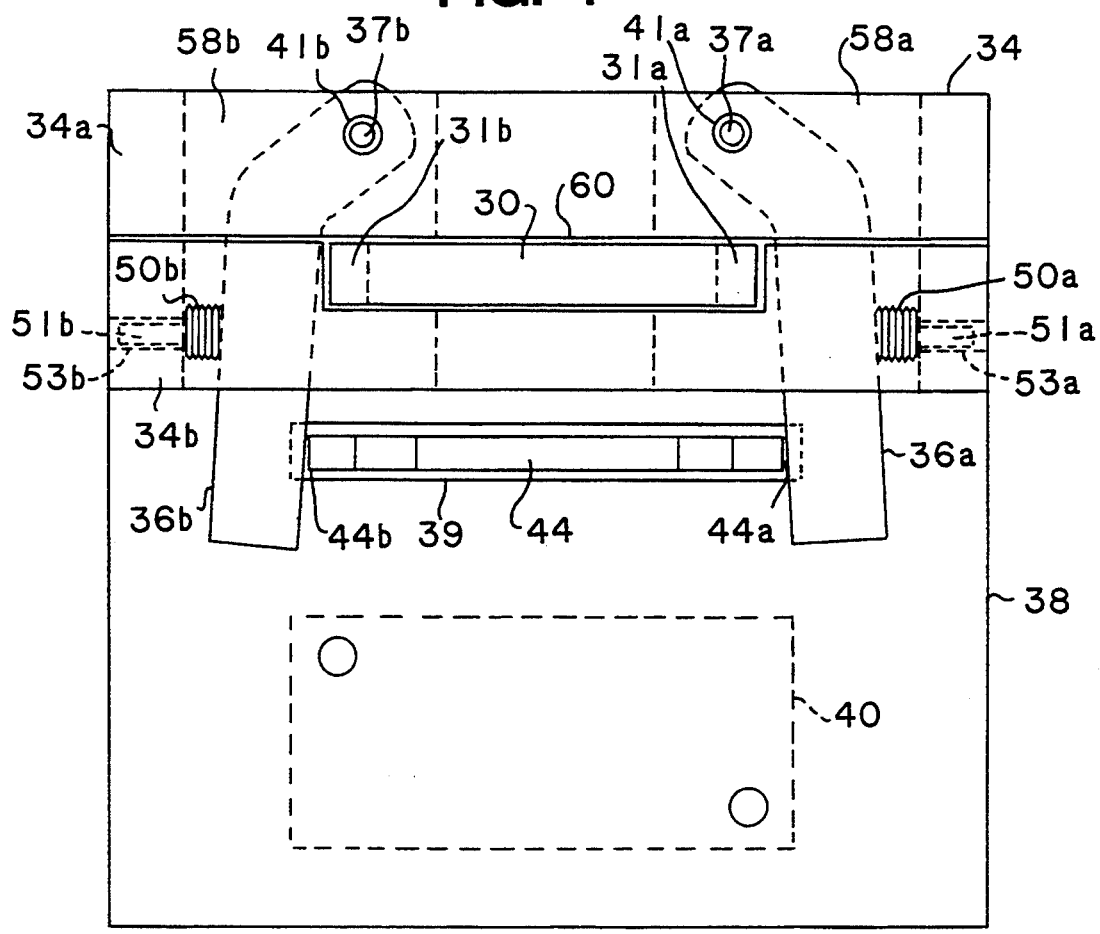
FIG. 4 illustrates further details of the operation of the secondary disconnect mechanism of FIGS. 2 and 3.

FIG. 4 illustrates the position of the arms 36a, 36b after the circuit device 14 has fully reached the test position (T). At this point, the full width of the tongue member 44 extends through the opening 39. As shown, the edges 44a, 44b of the tongue member force the arms 36a, 36b outward so that they no longer engage their respective slots 31a, 31b. Consequently, the slide member 34 is now free to slide along the guide rail 30. As can be appreciated, when the slide member 34 returns to position T' upon removal of the circuit breaker, and the tongue member 44 is then withdrawn from the opening 39, the springs 50a, 50b will urge their respective arms 36a, 36b toward each other so that they again pivot into their respective slots 31a, 31b thereby locking the slide member 34 in place.

Figure 5:
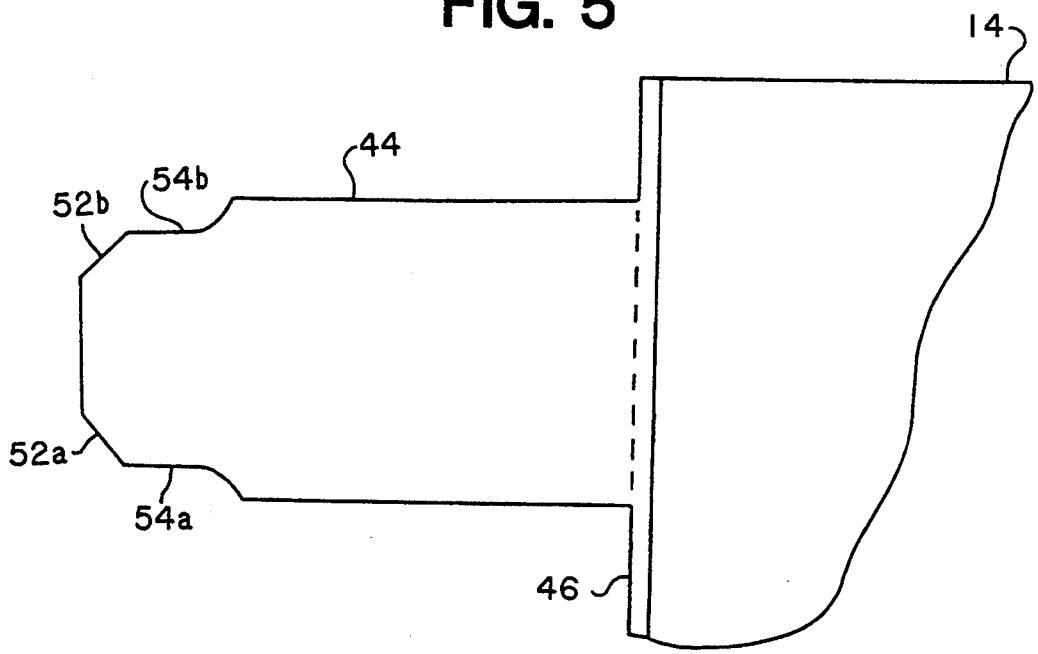
FIG. 5 is a top view of the tongue member of FIGS. 2–4.

FIG. 5 is a top view of the tongue member 44 according to the preferred embodiment of the present invention. As shown, the tongue member has angled surfaces 52a, 52b that initially engage the respective arms 36a, 36b as the tongue member 44 begins to pass through the opening 39 in bracket 38. Upon further insertion of the tongue member 44 through the opening 39, the curved surfaces 54a, 54b engage the respective arms 36a, 36b. As shown, the slope of each curved surface 54a, 54b increases sharply toward the rearward portion of the curve. As can be appreciated, the increased slope at the rear portion of each curved surface 54a, 54b accelerates the lateral movement of each pivot arm 36a, 36b thereby causing a relatively abrupt release of the slide member 34 from its locked position T' as the circuit device 14 reaches the test position (T).

Figure 6:
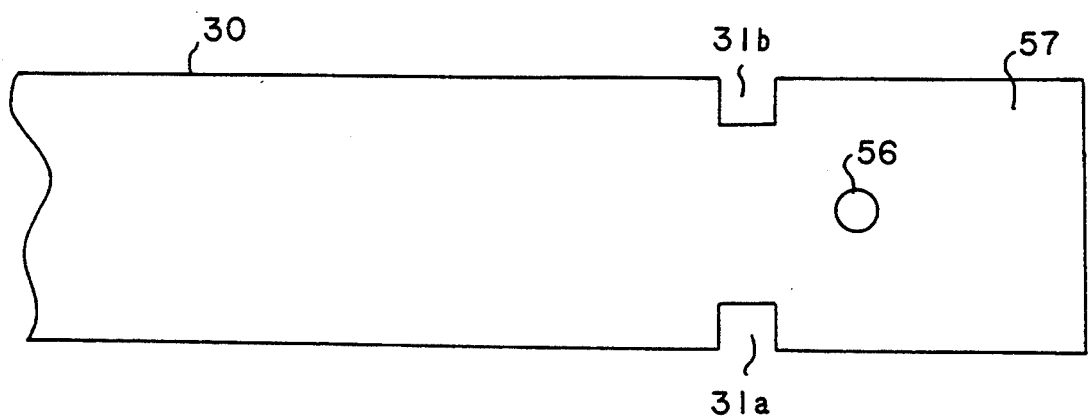
FIG. 6 is a top view of the guide rail of FIGS. 2–4.

FIG. 6 is a top view illustrating further details of the guide rail 30. As shown, the slots 31a, 31b are formed on opposite side edges of the guide rail 30 proximate the forward end thereof. The slots 31a, 31b must be positioned on the guide rail 30 such that when the slide member is at point T', the slots 31a, 31b are aligned with the respective pivot arms 36a, 36b.

Figure 7:
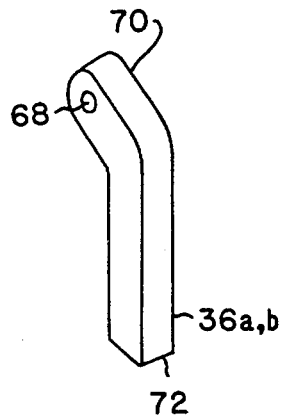
FIG. 7 is a perspective view illustrating further details of the pivot arms of FIGS. 2–4.

FIG. 7 is a perspective view illustrating further details of each pivot arm 36a,b. As shown, the proximal end 70 of each pivot arm 36a,b has a cylindrical bore 68 extending therethrough. As described below in greater detail, the arms 36a, 36b are pivotally mounted to the slide member 34 by inserting rotation shafts 37a, 37b through the respective bores 68.

Figure 8A:
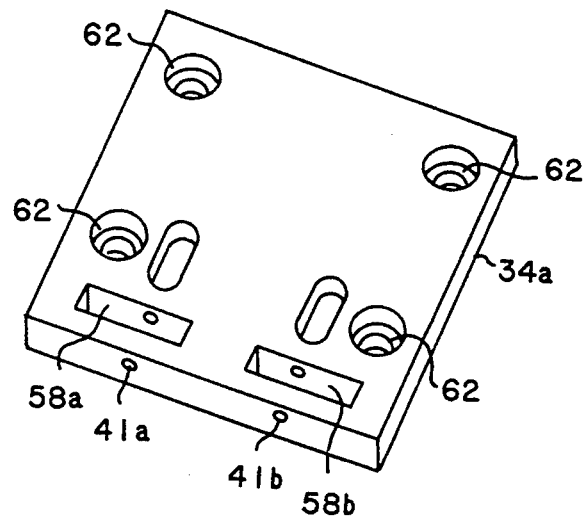
FIGS. 8a and 8b illustrate further details of the slide member of FIGS. 2–4.
Figure 8B:
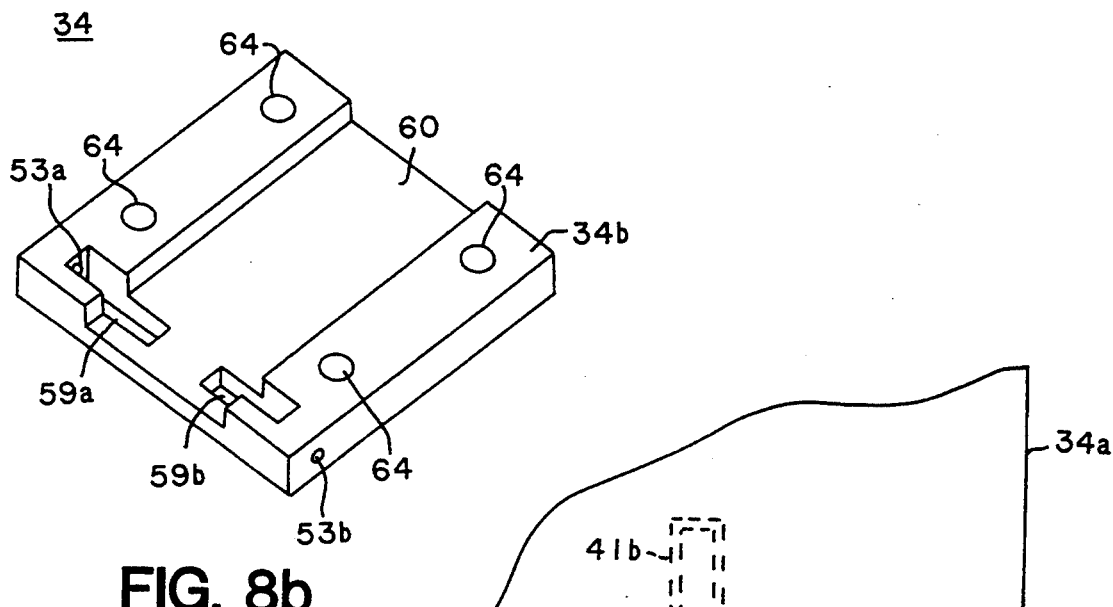

FIGS. 8a and 8b illustrate further details of the slide member 34. As mentioned above, the slide member 34 preferably comprises a two-piece assembly having a top plate 34a and a bottom plate 34b. The slide member 34 is mounted on the guide rail by positioning the respective plates 34a, 34b on opposite sides of the guide rail 30 and then coupling the two plates together via mounting holes 62, 64. A longitudinal channel formed in the bottom plate 34b cooperates with the underside of the top plate 34b to form the lengthwise opening 60 through which the guide rail 30 extends. Cutouts 58a, 58b are provided in the top plate 34a for mounting the respective arms 36a, 36b. When the slide member 34 is assembled on the guide rail 30, the distal ends 72 of each arm 36a, 36b extend through respective cutouts 59a, 59b in the bottom plate 34b of the slide member 34. As explained above, the compression springs 50 (FIGS. 3 and 4) that bias the arms 36a, 36b toward their respective slots 31a, 31b are held in place by pins 51a, 51b that are inserted through respective bores 53a, 53b in the bottom plate 34b of the slide member 34.

Figure 9:
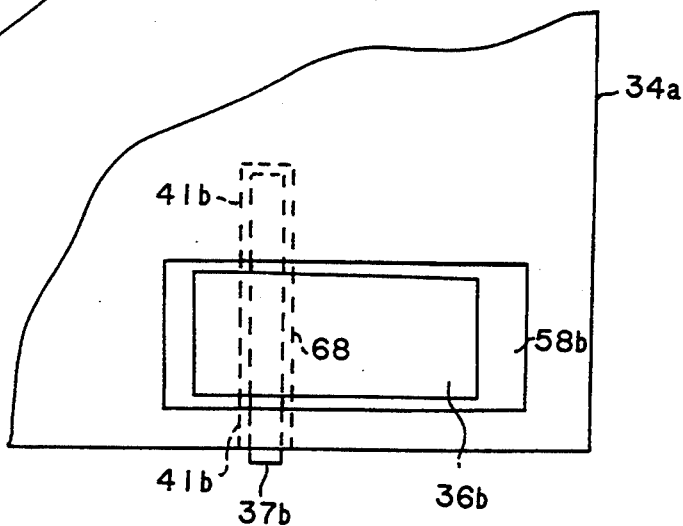
FIG. 9 is an enlarged top view of a portion of the slide member of FIGS. 2–4 illustrating further details of the mounting of a pivot arm to the slide member.
Figure 10:
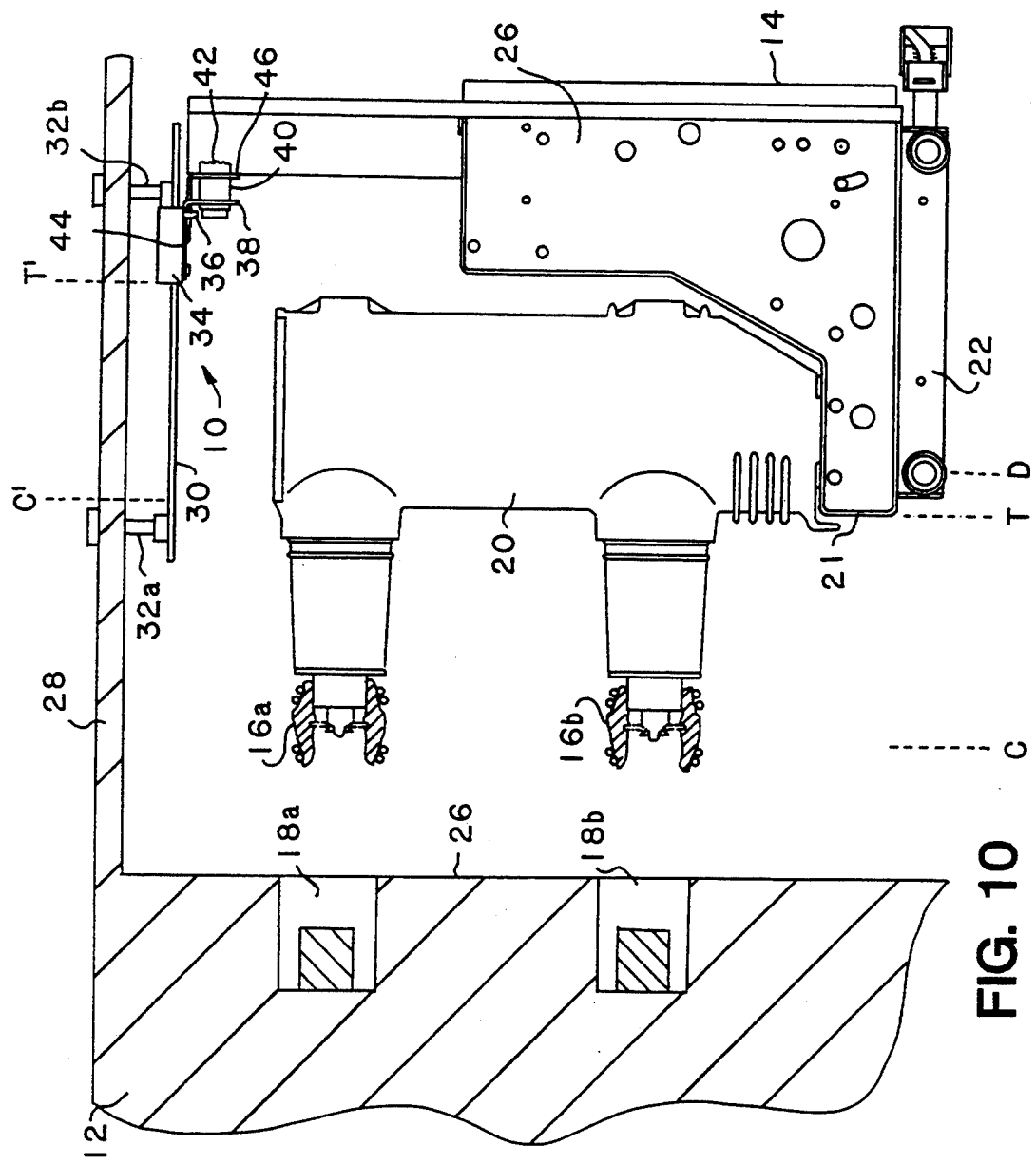
FIG. 10 illustrates the operation of the secondary disconnect mechanism of the present invention as the circuit breaker of FIG. 1 moves from the disconnect position (D) to tie test position (T)

FIG. 9 illustrates the mounting of arm 36b to the slide member 34 in greater detail. As shown, the proximal end 70 of arm 36a is positioned in the cutout 58b so that the bore 68 of the arm 36a is aligned with the cylindrical bore 41b in the top plate 34a. A rotation shaft 37b is then inserted through the aligned bores 41a and 68 thereby pivotally mounting the arm 36b to the top plate. Arm 36a is mounted in a similar fashion. Referring now to FIGS. 1, 10 and 11, the operation of the automatic secondary disconnect mechanism of the present invention will be described. FIG. 1 shows the circuit breaker 14 in the disconnect position (D). At this position, both the primary contacts 16, 18 and secondary contacts 40, 42 are disengaged, and the circuit breaker 14 may be completely removed from the enclosure for repair or storage, etc. When the circuit breaker 14 is in the disconnect position, the slide member 34 is locked in place at position T', i.e., the arms 36a,b are engaged with the respective slots 31a,b on the guide rail 30.

Upon insertion of the circuit breaker 14 into the enclosure 12 (using the racking mechanism 22), the circuit breaker moves from the disconnect position (D) to the test position (T). FIG. 10 shows the circuit breaker 14 in the test position (T). As shown, at the test position, the mating secondary contact members 40, 42 are fully engaged, but the primary contacts 16, 18 are not engaged. Consequently, power is provided to the auxiliary devices and control circuit of the circuit device 14 via the engaged secondary contact members 40, 42. As can be appreciated, suitable wiring (not show) must run from the secondary contact member 40 to a power source on the enclosure, and suitable wiring (not shown) must also run from the secondary contact member 42 to the auxiliary devices and control circuitry disposed in the housing 26 of the circuit device 14.

According to an important feature of the present invention, the slide member 34 remains locked to the guide rail at point T' (i.e., the pivot arms 36a, 36b remain engaged with respective slots 31a, 31b) as the circuit device approaches the test position (T), thereby allowing the secondary contact members 40, 42 to engage. As the circuit device 14 reaches the test position (T), however, the tongue member 44 disengages the pivot arms 36a, 36b from their respective slots 31a, 31b. Preferably, the curved surfaces 54a, 54b of the tongue member 44 are positioned thereon such that the pivot arms 36a, 36b become disengaged from their respective slots 31a, 31b just as the secondary contact members reach full engagement at the test position (T) of the circuit device 14.

With the pivot arms 36a, 36b disengaged from their respective slots 31a, 31b, the slide member 34 is free to move with the circuit breaker 14 along the guide rail 30 as the circuit breaker 14 moves between the test (T) and connect (C) positions. FIG. 11 shows the circuit breaker in the connect position (C). At the connect position, the primary contacts 16, 18 of the circuit breaker are fully engaged, and the slide member 34 has moved to a point C' corresponding to the connect position (C) of the circuit breaker.

Upon subsequent withdrawal of the circuit breaker from the enclosure, the slide member 34 (due to the engagement of the secondary contacts 40, 42) moves with the circuit breaker 14 as the circuit breaker 14 moves back to the test position (T). At this point, the slide member 34 has returned to position T'. However, until the circuit device moves past the test position toward the disconnect position, the tongue member 44 continues to hold the pivot arms 36a, 36 apart, and therefore, the slide member 34 is still free to slide along the guide rail 30.

When the circuit device 14 moves from the test position to the disconnect position, however, the guide rail mounting hardware 32b serves as a "stop member" to prevent the slide member 34 from moving with the circuit breaker 14. Consequently, as the circuit device 14 moves toward the disconnect position, the tongue member 44 is withdrawn from the opening 39 in bracket 38, thereby releasing the pivot arms 36a, 36b and allowing them to pivot back into their respective slots 31a, 31b. Thus, the slide member 34 is again locked in place on the guide rail 30 at point T'.

As the foregoing illustrates, the present invention is directed to an automatic secondary disconnect mechanism for an electrical switchgear apparatus having an enclosure and a removable circuit device equipped with mating secondary contacts members, that enables the mating secondary contact members to engage automatically as the circuit device moves from a disconnect position to a test position, to remain engaged and move with the circuit device (via the slide member) as the circuit device moves between the test position and a connect position, and to disengage automatically as the circuit device moves past the test position back toward the disconnect position. It is understood that changes could be made to the embodiment described above without departing from the spirit or essential attributes of the present invention. For example, rather than mounting the guide rail 30 and slide member 34 to the enclosure 12 while fixedly attaching the tongue member 44 to the circuit device 14, the opposite arrangement may be employed wherein the guide rail 30 and slide member 34 are mounted on the circuit device and the tongue member 44 is fixedly mounted on the enclosure. As can be appreciated, in such an embodiment, once the secondary contact members engage at the test position, the slide member 34 would release from the guide rail, but would essentially remain stationary while the circuit device and guide rail continued to move together into the connect position. Accordingly, reference should be made to the appended claims, rather than to the foregoing specification, as indicating the scope of the invention.

What is claimed is:

1. An automatic secondary disconnect mechanism for an electrical switchgear apparatus having an enclosure and a removable circuit device wherein the circuit device is movable into and out of the enclosure between disconnect, test and connect positions, said automatic secondary disconnect mechanism comprising:

a guide rail mounted on one of said enclosure and said circuit device, said guide rail extending substantially parallel to the direction of movement of the circuit device into and out of the enclosure;

a slide member slidably mounted on said guide rail;

means for locking said slide member in place on said guide rail at a point corresponding to the test position of the circuit device;

means cooperating with said locking means for releasing said slide member from its locked position when the circuit device reaches the test position from the disconnect position, and for maintaining said release to enable said slide member to move relative to said guide rail as the circuit device moves between the test and connect positions; and a pair of mating secondary contact members, one of said secondary contact members being coupled to said slide member, the other of said secondary contact members being coupled to the other one of said enclosure and said circuit device, said mating secondary contact members being disposed relative to each other such that when the slide member is in its locked position on the guide rail, the secondary contact members will engage as the circuit device moves from the disconnect position to the test position.

2. An automatic secondary disconnect mechanism as recited in claim 1 wherein said guide rail has a slot formed therein proximate said point corresponding to the test position of the circuit device, and wherein said locking means comprises at least one arm pivotally mounted on said slide member which pivots into said slot thereby locking said slide member to said guide rail at said point.

3. An automatic secondary disconnect mechanism as recited in claim 2 further comprising a spring that biases said arm toward said slot.

4. An automatic secondary disconnect mechanism as recited in claim 2 wherein said releasing means comprises a rigid tongue member mounted on said other one of said enclosure and said circuit device which engages said arm and pivots said arm out of said slot when the circuit device reaches the test position from the disconnect position.

5. An automatic secondary disconnect mechanism as recited in claim 4 wherein said guide rail has a stop member disposed thereon proximate said point corresponding to the test position of the circuit device, said stop member being operable to prevent said slide member from sliding past said point when the circuit device moves past the test position toward the disconnect position.

6. An automatic secondary disconnect mechanism as recited in claim 1 wherein said guide rail has a pair of slots formed on opposite side edges thereof proximate said point corresponding to the test position of said circuit device, and wherein said locking means comprises:
- a pair of opposing arms each pivotally mounted on said slide member, each arm being operable to pivot into a respective one of the slots.

7. An automatic secondary disconnect mechanism as recited in claim 6 wherein said locking means further comprises at least one spring for biasing said arms toward the respective slots.

8. An automatic secondary disconnect mechanism for an electrical switchgear apparatus having an enclosure and a removable circuit device wherein the circuit device is movable into and out of the enclosure between disconnect, test and connect positions, said automatic secondary disconnect mechanism comprising:
- a guide rail mounted on the enclosure and extending substantially parallel to the direction of movement of the circuit device into and out of the enclosure;
- a slide member slidably mounted on said guide rail and adapted to slide back and forth lengthwise of said guide rail;
- means disposed on said slide member for locking said slide member in place on said guide rail at a point corresponding to the test position of said circuit device;
- means disposed on the circuit device which cooperates with said locking means for releasing said slide member from its locked position when the circuit device reaches the test position from the disconnect position, and for maintaining said release to enable said slide member to slide along said guide rail as the circuit device moves between the test and connect positions; and
- a pair of mating secondary contact members, one of said secondary contact members being coupled to said slide member, the other of said secondary contact members being coupled to the circuit device, said mating secondary contact members being disposed relative to each other such that when said slide member is in its locked position, the secondary contact members will engage as the circuit device moves from the disconnect position to the test position.

9. An automatic secondary disconnect mechanism as recited in claim 8 wherein said guide rail has a slot formed therein proximate said point corresponding to the test position of the circuit device, and wherein said locking means comprises at least one arm pivotally mounted on said slide member which pivots into said slot thereby locking said slide member to said guide rail at said point.

10. An automatic secondary disconnect mechanism as recited in claim 9 further comprising a spring that biases said arm toward said slot.

11. An automatic secondary disconnect mechanism as recited in claim 9 wherein said releasing means comprises a rigid tongue member coupled to the circuit device which engages said arm and pivots said arm out of said slot when the circuit device reaches the test position from the disconnect position.

12. An automatic secondary disconnect mechanism as recited in claim 11 wherein said guide rail has a stop member disposed thereon proximate said point corresponding to the test position of the circuit device, said stop member being operable to prevent said slide member from sliding past said point when the circuit device moves past the test position toward the disconnect position.

13. An automatic secondary disconnect mechanism as recited in claim 8 wherein said guide rail has a pair of slots formed on opposite side edges thereof proximate said point corresponding to the test position of said circuit device, and wherein said locking means comprises:
- a pair of opposing arms each pivotally mounted on said slide member, each arm being operable to pivot into a respective one of the slots.

14. An automatic secondary disconnect mechanism as recited in claim 13 wherein said locking means further comprises at least one spring biasing said arms toward the respective slots.

15. An automatic secondary disconnect mechanism for an electrical switchgear apparatus having an enclosure and a removable circuit breaker wherein the circuit breaker is movable into and out of the enclosure between disconnect, test and connect positions, said automatic secondary disconnect mechanism comprising:
- a guide rail mounted on the enclosure and extending substantially parallel to the direction of movement of the circuit breaker into and out of the enclosure, said guide rail having at least one slot formed therein proximate a point corresponding to the test position of said circuit breaker;
- a slide member slidably mounted on said guide rail movable back and forth lengthwise of said guide rail;
- at least one arm pivotally mounted on said slide member and operable to pivot into the slot formed on the guide rail when the slide member is positioned at said point corresponding to the test position of said circuit breaker, said point thereby defining a locked position of said slide member;
- a rigid tongue member coupled to the circuit breaker which engages said arm and pivots said arm out of the slot when the circuit breaker reaches the test position from the disconnect position, thereby enabling said slide member to slide along said guide rail; and
- a pair of mating secondary contact members, one of said secondary contact members being coupled to said slide member, the other of said secondary contact members being coupled to the circuit breaker, said mating secondary contact members being disposed relative to each other such that when the slide member is in its locked position, the secondary contact members will engage as the circuit breaker moves from the disconnect position to the test position.

16. An automatic secondary disconnect mechanism as recited in claim 15 further comprising a spring coupled to said pivotally mounted arm and operable to bias said arm toward said slot.

17. An automatic secondary disconnect mechanism as recited in claim 15 wherein said guide rail further includes a stop member disposed thereon proximate the point corresponding to the test position of said circuit breaker, said stop member being operable to prevent said slide member from sliding past said point when said circuit breaker moves past the test position toward the disconnect position.

18. An automatic secondary disconnect mechanism as recited in claim 15 wherein said guide rail has a pair of slots formed on opposite side edges thereof proximate said point corresponding to the test position of the circuit device, and wherein said automatic secondary disconnect mechanism comprises:

a pair of opposing arms each pivotally mounted on said slide member, each arm being operable to pivot into a respective one of the slots.

19. An automatic secondary disconnect mechanism as recited in claim 18 further comprising at least one spring biasing said arms toward each other.

* * * * *